US012777346B2

(12) United States Patent
Nayak et al.

(10) Patent No.: US 12,777,346 B2
(45) Date of Patent: Oct. 27, 2026

(54) PRIMARY LINK CHANGE PROCEDURE FOR A MOBILE AP MLD

(71) Applicant: Samsung Electronics Co., Ltd., Suwon-si (KR)

(72) Inventors: Peshal Nayak, Plano, TX (US); Rubayet Shafin, Allen, TX (US); Boon Loong Ng, Plano, TX (US); Vishnu Vardhan Ratnam, Plano, TX (US); Ahmed Atef Ibrahim Ibrahim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 18/055,389

(22) Filed: Nov. 14, 2022

(65) Prior Publication Data

US 2023/0189023 A1 Jun. 15, 2023

Related U.S. Application Data

(60) Provisional application No. 63/398,447, filed on Aug. 16, 2022, provisional application No. 63/333,445, (Continued)

(51) Int. Cl.
*H04W 24/04* (2009.01)
*H04W 72/54* (2023.01)
*H04W 76/15* (2018.01)

(52) U.S. Cl.
CPC ........... *H04W 24/04* (2013.01); *H04W 72/54* (2023.01); *H04W 76/15* (2018.02)

(58) Field of Classification Search
CPC ..... H04W 24/04; H04W 72/54; H04W 76/15; H04W 36/28; H04W 76/19; H04W 84/12
See application file for complete search history.

(56) References Cited

U.S. PATENT DOCUMENTS

2009/0135785 A1* 5/2009 Fiat ........................ H04W 24/10 370/332
2013/0250778 A1* 9/2013 Charbit ................. H04W 40/02 370/329
(Continued)

FOREIGN PATENT DOCUMENTS

CN 107995669 B * 2/2021 ............ H04W 48/20
KR 10-2021-000788 A1 1/2021
(Continued)

OTHER PUBLICATIONS

Kaiying Lu: "Resolution for Miscellaneous CIDs related to Clause 35.3.18 (CC36)", IEEE 802.11-21 /1786R0, IEEE, Dec. 4, 2021 (Dec. 4, 2021) (Year: 2021).*
(Continued)

*Primary Examiner* — Yuwen Pan
*Assistant Examiner* — Swati Jain

(57) ABSTRACT

Methods and apparatuses for facilitating a primary link change procedure for mobile AP MLD are provided. A method for wireless communication performed by an access point (AP) multi-link device (MLD), the AP MLD comprising APs forming a mobile AP MLD, the method comprising: forming links with corresponding stations (STAs) associated with a non-AP MLD; instructing the APs to form a first link and a second link with the corresponding STAs; designating the first link as a primary link and the second link as a non-primary link; determining that the primary link is experiencing degradation; and in response to determining that the primary link is experiencing degradation, effecting a change in the primary link designation, or implementing a channel change procedure to change a channel within the primary link.

20 Claims, 11 Drawing Sheets

Related U.S. Application Data filed on Apr. 21, 2022, provisional application No. 63/288,168, filed on Dec. 10, 2021.

(56) References Cited

U.S. PATENT DOCUMENTS

| | | | | |
|---|---|---|---|---|
| 2021/0409979 | A1* | 12/2021 | Wang | H04L 45/24 |
| 2022/0287121 | A1* | 9/2022 | Hwang | H04W 74/085 |
| 2022/0418018 | A1* | 12/2022 | Jang | H04L 9/40 |
| 2023/0379995 | A1* | 11/2023 | Patil | H04W 76/15 |
| 2024/0251282 | A1* | 7/2024 | Kim | H04L 69/14 |
| 2024/0314871 | A1* | 9/2024 | Lu | H04W 76/15 |
| 2025/0088874 | A1* | 3/2025 | Jang | H04W 76/15 |
| 2025/0168884 | A1* | 5/2025 | Jang | H04L 9/40 |
| 2026/0067971 | A1* | 3/2026 | Lu | H04W 76/15 |

FOREIGN PATENT DOCUMENTS

| | | | | |
|---|---|---|---|---|
| KR | 10-2021-0007881 | A | 1/2021 | |
| KR | 20210007881 | A * | 1/2021 | H04W 76/15 |
| WO | 2021107685 | A1 | 6/2021 | |

OTHER PUBLICATIONS

Matthew Fischer (Broadcom Inc): "CR-CID-5672-dynamic-NSTR-bitmap", IEEE Draft; 11-21-1547-00-00BE-CR-CID-5672-DYNAMIC-NSTR-BITMAP, IEEE-SA Mentor, Piscataway, NJ USA, vol. 802.11 EHT; 802.11 be Sep. 17, 2021 (Sep. 17, 2021), pp. 1-4. (Year: 2021).*

Murti et al., "Multi-Link Operation with Enhanced Synchronous Channel Access in IEEE 802.11be Wireless LANs: Coexistence Issue and Solutions", Sensors, vol. 21, Issue 23, No. 7974, Nov. 2021, 24 pages. (Year: 2021).*

Guo et al., "CR for TXOP Termination of NSTR MLD", IEEE 802.11-21/1416r1, Oct. 2021, 4 pages. (Year: 2021).*

Extended European Search Report issued Oct. 22, 2024 regarding Application No. 22904521.6, 14 pages.

IEEE P802.11be—D2.0 "Part 11: Wireless LAN Medium Access Control (MAC) and Physical Layer (PHY) Specifications-Amendment 8: Enhancements for extremely high throughput (EHT)" May 2022, 873 pages.

IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

International Search Report and Written Opinion issued Feb. 9, 2023 regarding International Application No. PCT/KR2022/018421, 10 pages.

Lu, "Resolution for Miscellaneous CIDs related to Clause 35.3.18(CC36)", IEEE 802.11-21/1786r1, Dec. 2021, 12 pages.

Fischer, "CR CID 5672 dynamic NSTR bitmap", IEEE 802.11-21/1547r0, Sep. 2021, 4 pages.

Muturi et al., "Multi-Link Operation with Enhanced Synchronous Channel Access in IEEE 802.11be Wireless LANs: Coexistence Issue and Solutions", Sensors, vol. 21, Issue 23, No. 7974, Nov. 2021, 24 pages.

Guo et al., "CR for TXOP Termination of NSTR MLD", IEEE 802.11-21/1416r1, Oct. 2021, 4 pages.

* cited by examiner

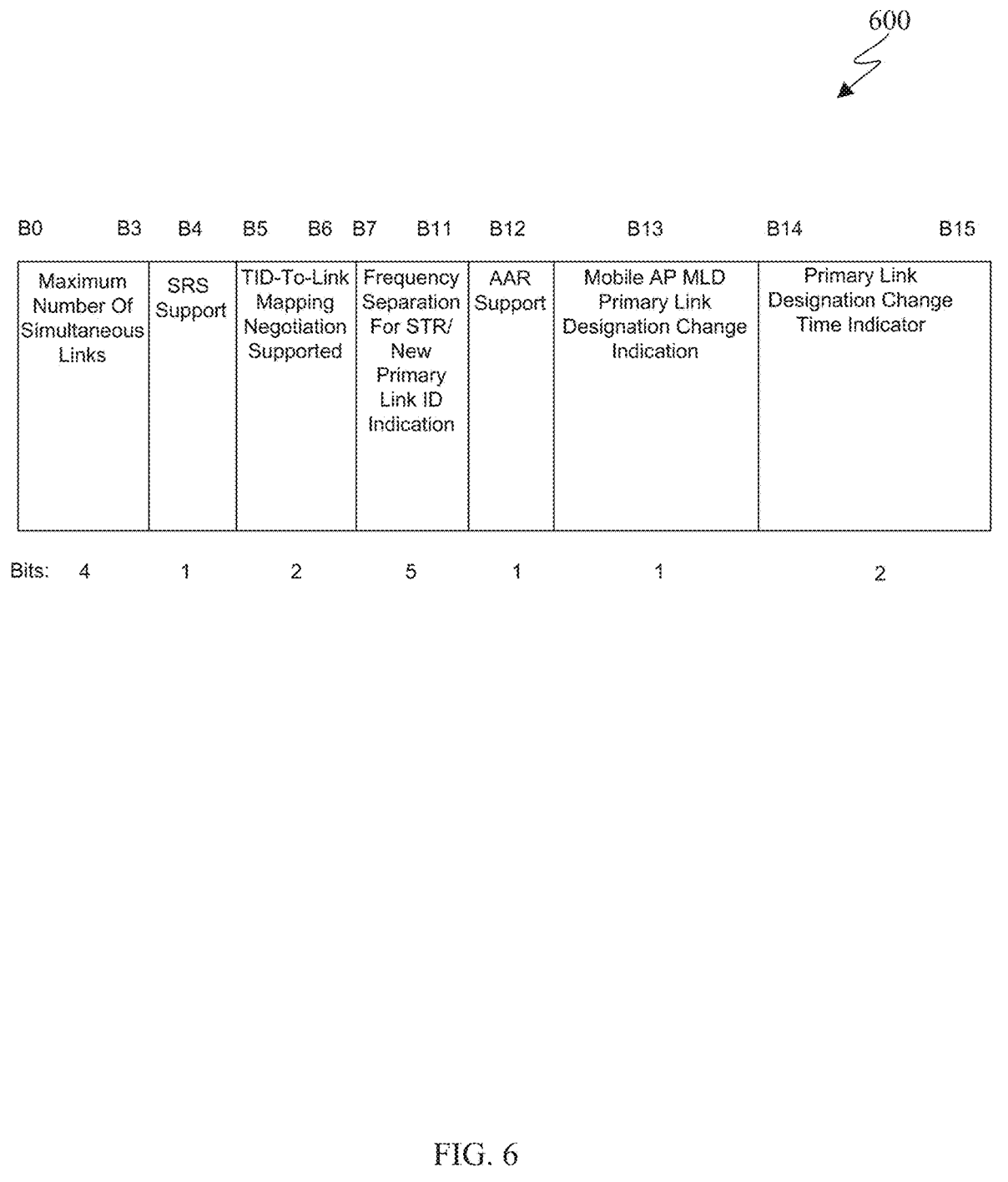

600

| | | | | | | | |
|---|---|---|---|---|---|---|---|
| | B0 B3 | B4 | B5 B6 | B7 B11 | B12 | B13 | B14 B15 |
| | Maximum Number Of Simultaneous Links | SRS Support | TID-To-Link Mapping Negotiation Supported | Frequency Separation For STR/ New Primary Link ID Indication | AAR Support | Mobile AP MLD Primary Link Designation Change Indication | Primary Link Designation Change Time Indicator |
| Bits: | 4 | 1 | 2 | 5 | 1 | 1 | 2 |

FIG. 6

PRIMARY LINK CHANGE PROCEDURE FOR A MOBILE AP MLD

CROSS-REFERENCE TO RELATED APPLICATION(S) AND CLAIM OF PRIORITY

This application claims priority under 35 U.S.C. § 119(e) to U.S. Provisional Patent Application No. 63/288,168 filed on Dec. 10, 2021, U.S. Provisional Patent Application No. 63/333,445 filed on Apr. 21, 2022, and U.S. Provisional Patent Application No. 63/398,447 filed on Aug. 16, 2022, which are hereby incorporated by reference in their entirety.

TECHNICAL FIELD

This disclosure relates generally to a primary link change procedure for a mobile AP MLD.

BACKGROUND

An AP MLD is typically able to simultaneously transmit and receive over all of its links. However, 802.11be standards define a special AP MLD, namely, NSTR Mobile AP MLD, which can have NSTR link pairs. An NSTR mobile AP MLD has a number of use cases (e.g., Wi-Fi hotspot support, peer to peer operation, etc.). As per the 802.11be standard, an NSTR mobile AP MLD shall designate one link of an NSTR link pair as the primary link. The other link of the NSTR link pair becomes the non-primary link.

IEEE 802.11be standards define primary link and non-primary link for NSTR Mobile AP MLD. The NSTR Mobile AP MLD designates one link of an NSTR link pair as the primary link and other link of the NSTR link pair as the non-primary link. Further, the non-primary link transmissions of a STA affiliated with the non-AP MLD (or the AP affiliated with the NSTR mobile AP MLD) are constrained so that they may happen only if the corresponding STA affiliated with the non-AP MLD (or the corresponding AP affiliated with the NSTR mobile AP MLD) is also initiating a transmission as a TXOP holder with the same start time. This can create some performance issues for the NSTR Mobile AP MLD especially when the primary link performance degrades or the primary link becomes inoperable due to a number of reasons, some of which are explained below, and the Mobile AP MLD may want to change the primary link designation:

Network congestion: It is possible that the network is highly contested in the primary link resulting in large delays in channel capture for the AP1 affiliated with the NSTR Mobile AP MLD or the STA1 affiliated with the non-AP MLD. Due to the transmission constraints on the non-primary link, AP2 and the STA2 will also face a performance degradation despite having a non-congested channel on the non-primary link.

RF environment degradation: It is possible that due to RF degradation, the primary link's condition can become inoperable. As a result, the performance of the non-primary link will also suffer.

Radar operation: As per the DFS operation described in Clause 11.8, an AP is required to move the BSS to a different channel if radar operation is detected on its current channel of operation. The standard mandates that before moving to a new channel, the AP has to perform a check to ensure that the new channel does not have radar operation on it. If radar operation is detected on the new channel, the AP may need to select another channel and continue the check until a channel without radar operation is detected. Depending on the region and the selected channel, such checks can take up to several minutes until a suitable channel is found. During such checks, the primary link may not be available and consequently, the performance on the non-primary link can also get disrupted. Further, the AP affiliated with the NSTR Mobile AP MLD and forming the primary link might have established a restricted TWT schedule with another non-AP MLD. Now if the primary link becomes unavailable, the latency sensitive traffic flow of the non-AP MLD will be interrupted as the non-primary link also becomes inoperable.

Consequently, the Mobile AP MLD may want to change the primary link designation. As a result, a solution to enable the Mobile AP MLD to change the primary link designation is needed.

SUMMARY

Embodiments of the present disclosure provide methods and apparatuses for a primary link change procedure for a mobile AP MLD.

In one embodiment, a multi-link device (MLD) comprises: access points (APs) forming a mobile AP MLD, each AP comprising a transceiver configured to form a link with a corresponding station (STA) associated with a non-AP MLD; and a processor operably coupled to the APs, the processor configured to: instruct the (APs) to form a first link and a second link with the corresponding STAs; designate the first link as a primary link and the second link as a non-primary link; determine that the primary link is experiencing degradation; and in response to determining that the primary link is experiencing degradation, effect a change in the primary link designation, or implement a channel change procedure to change a channel within the primary link.

In another embodiment, a non-AP MLD comprises: STAs, each comprising a transceiver configured to form a primary link and a non-primary link with a corresponding AP of an MLD comprising APs forming a mobile AP MLD; and a processor operably coupled to the STAs, the processor, based on the primary link experiencing degradation, configured to receive via the transceiver an indication from the mobile AP MLD about a change in primary link designation.

In yet another embodiment, a method for wireless communication performed by an AP MLD, the AP MLD comprising APs forming a mobile AP MLD, the method comprising: forming links with corresponding STAs associated with a non-AP MLD; instructing the APs to form a first link and a second link with the corresponding STAs; designating the first link as a primary link and the second link as a non-primary link; determining that the primary link is experiencing degradation; and in response to determining that the primary link is experiencing degradation, effecting a change in the primary link designation, or implementing a channel change procedure to change a channel within the primary link.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example MLD capabilities subfield according to various embodiments of this disclosure;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated into the present disclosure as if fully set forth herein:

[1] IEEE P802.11be/D1.0—Draft Standard for Information technology—Telecommunications and information exchange between systems Local and metropolitan area networks—Specific requirements—Part 11: Wireless LAN Medium Access Control (MAC) and Physical Layer (PHY) Specifications—Amendment 8: Enhancements for extremely high throughput (EHT).

[2] IEEE 802.11-2020—IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
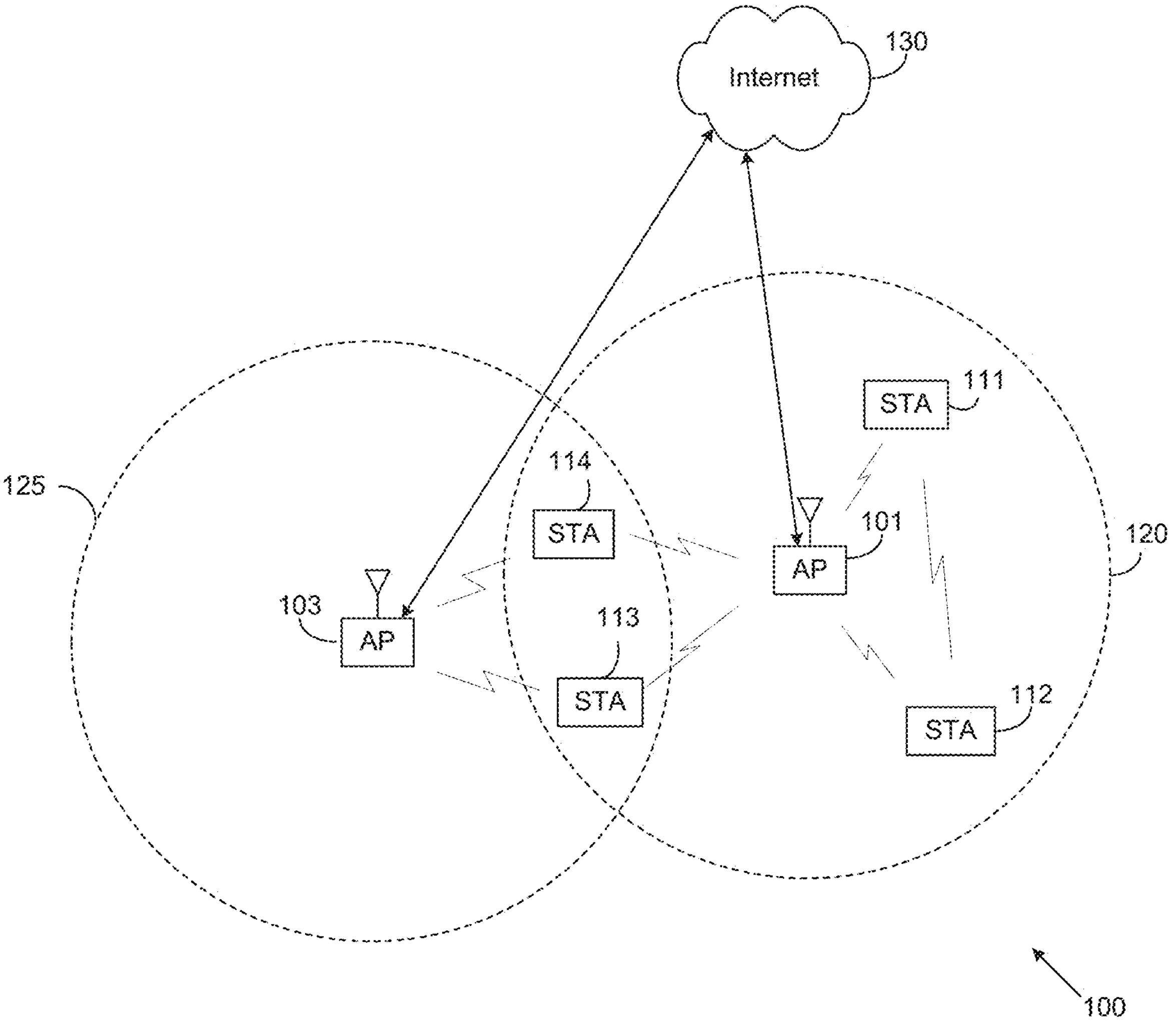
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating a primary link change procedure for mobile AP MLD. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
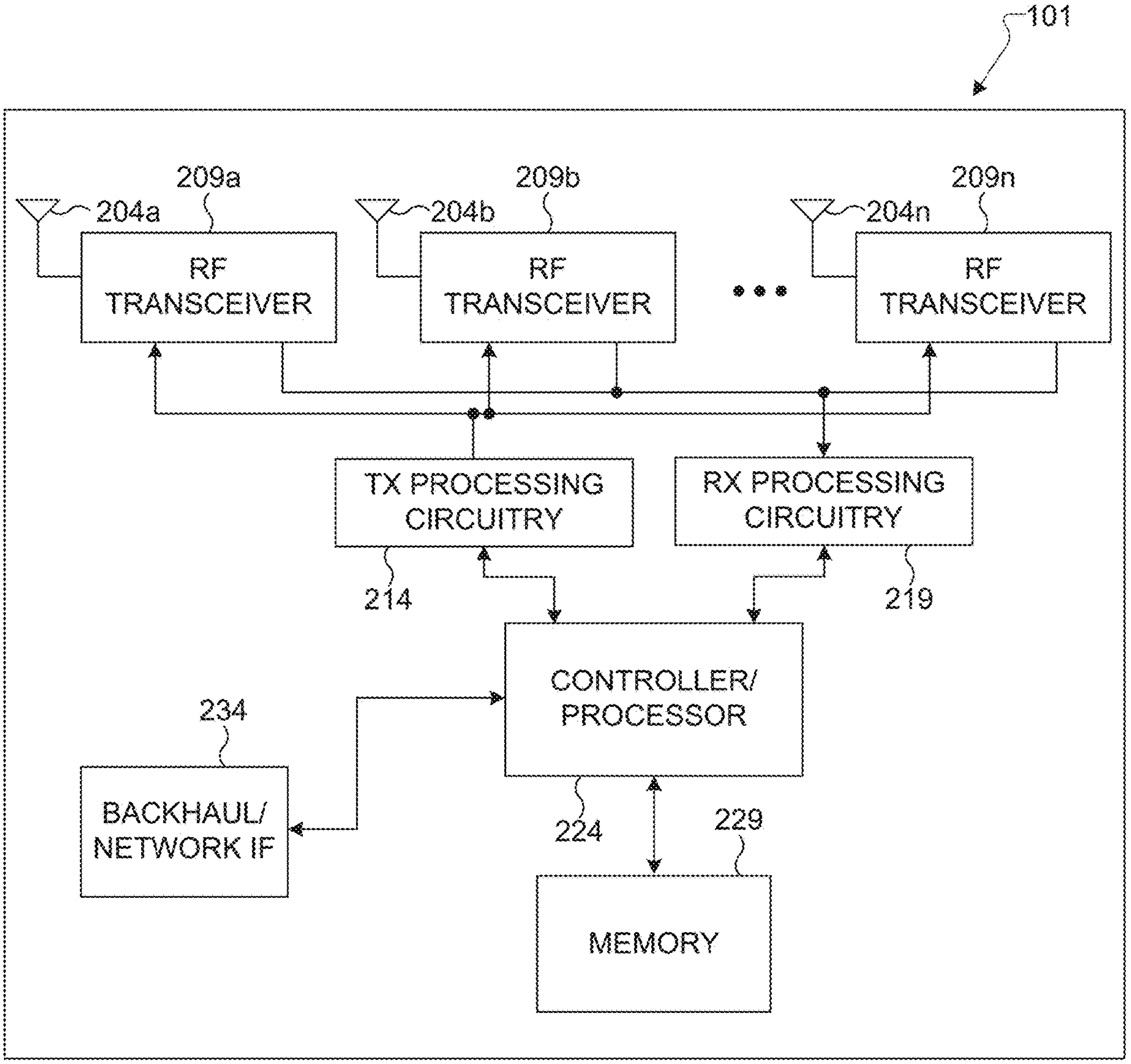
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas **204*a*-204*n*, multiple RF transceivers 209*a*-209*n*, transmit (TX) processing circuitry 214, and receive (RX) processing circuitry 219. The AP 101 also includes a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224** for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers **209*a*-209*n* receive the outgoing processed baseband or IF signals from the TX processing circuitry 214 and up-converts the baseband or IF signals to RF signals that are transmitted via the antennas 204*a*-204*n***.

The controller/processor 224 can include one or more processors or other processing devices that control the overall operation of the AP 101. For example, the controller/processor 224 could control the reception of forward channel signals and the transmission of reverse channel signals by the RF transceivers **209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating a primary link change procedure for mobile AP MLD. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229** as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating a primary link change procedure for mobile AP MLD. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
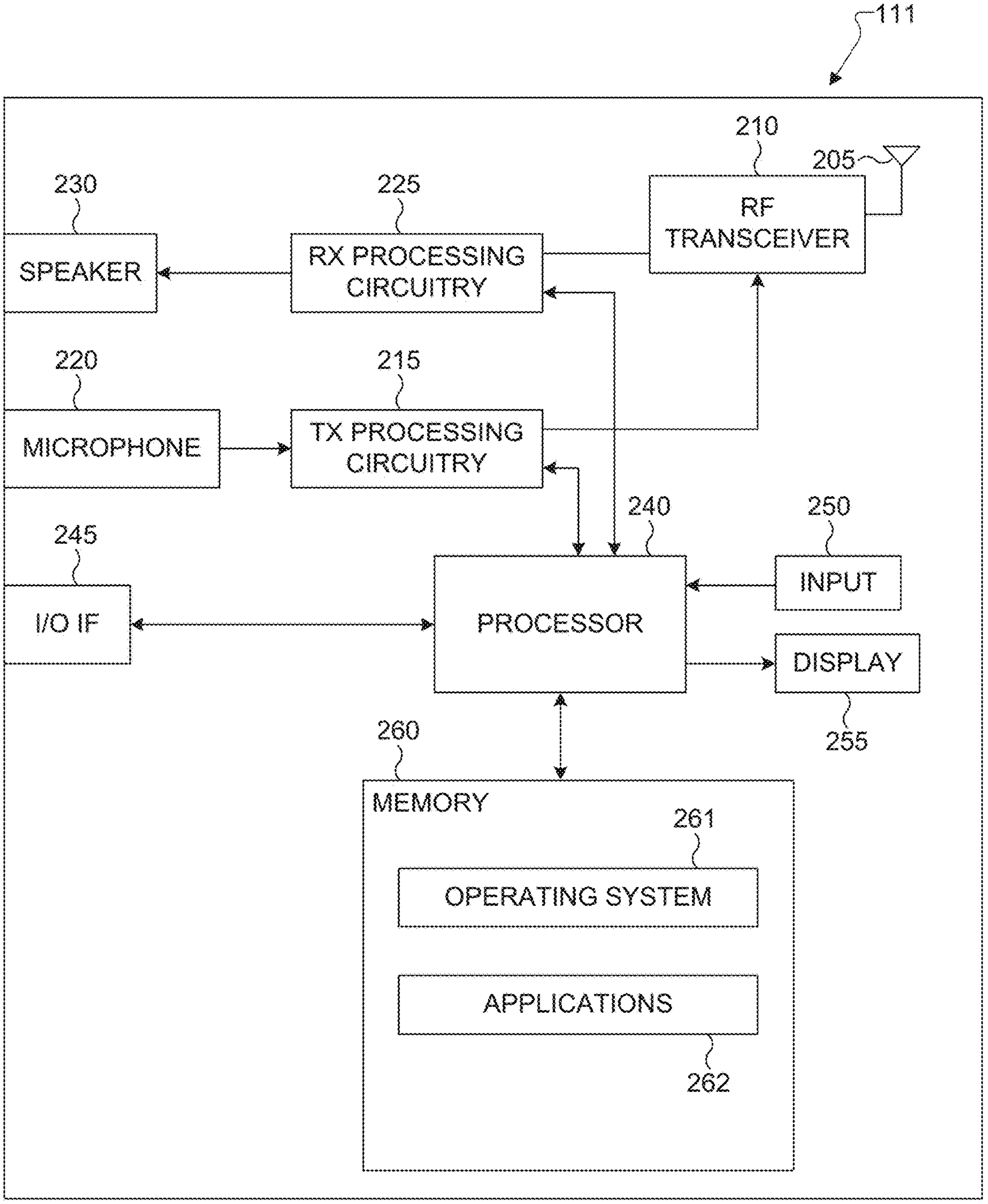
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the controller/processor 240 controls the reception of forward channel signals and the transmission of reverse channel signals by the RF transceiver 210, the RX processing circuitry 225, and the TX processing circuitry 215 in accordance with well-known principles. The controller/processor 240 can also include processing circuitry configured to facilitate a primary link change procedure for mobile AP MLD. In some embodiments, the controller/processor 240 includes at least one microprocessor or microcontroller.

The controller/processor 240 is also capable of executing other processes and programs resident in the memory 260, such as operations for facilitating a primary link change procedure for mobile AP MLD. The controller/processor 240 can move data into or out of the memory 260 as required by an executing process. In some embodiments, the controller/processor 240 is configured to execute a plurality of applications 262, such as applications for detect interference from a neighboring BSS and inform the associated AP of the interference. The controller/processor 240 can operate the plurality of applications 262 based on the OS program 261 or in response to a signal received from an AP. The controller/processor 240 is also coupled to the I/O interface 245, which provides STA 111 with the ability to connect to other devices such as laptop computers and handheld computers. The I/O interface 245 is the communication path between these accessories and the controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
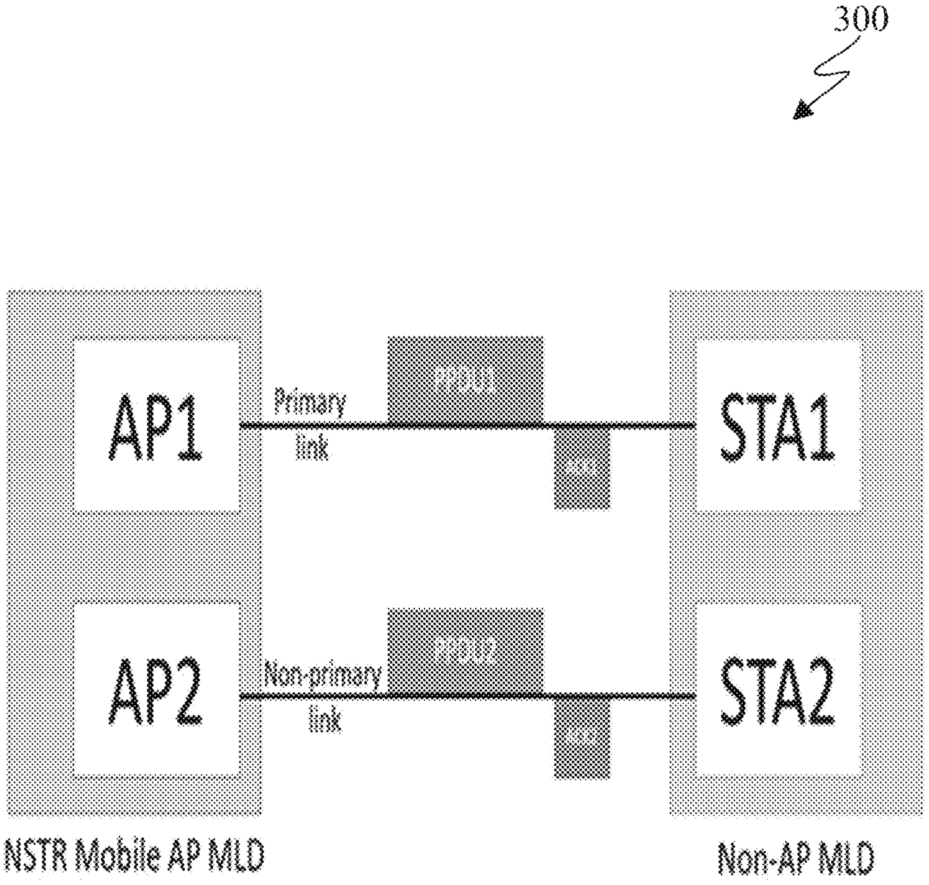
FIG. 3 illustrates an example of NSTR mobile AP MLD operation according to various embodiments of this disclosure.

FIG. 3 illustrates an example of NSTR mobile AP MLD operation 300 according to various embodiments of this disclosure. The embodiment of the example of NSTR mobile AP MLD operation 300 in FIG. 3 is for illustration only. Other embodiments of the example of NSTR mobile AP MLD operation 300 could be used without departing from the scope of this disclosure.

As depicted in FIG. 3, two APs namely AP1 and AP2 are affiliated with a NSTR Mobile AP MLD. Further, STA1 and STA2 are two non-AP STAs affiliated with a non-AP MLD. STA1 and STA2 are associated with AP1 and AP2 respectively resulting in two links. The link between AP1 and STA1 is designated as the primary link and the link between AP2 and STA2 is designated as the non-primary link. Further, according to the standard, beacons and probe response frames can be transmitted only on the primary link formed between AP1 and STA1. As the NSTR mobile AP MLD has NSTR link pairs, the STA1 and STA2 affiliated with the non-AP MLD that is associated with the NSTR mobile AP MLD and the AP1 and AP2 affiliated with the NSTR mobile AP MLD have to follow the start time sync and end time alignment constraints defined for NSTR operation. In addition to these constraints, when intending to transmit in the non-primary link, there are some additional constraints:

1. STA2 affiliated with the non-AP MLD may initiate a PPDU transmission to its associated AP (i.e., AP2) affiliated with the NSTR mobile AP MLD in the non-primary link only if STA1 affiliated with the same MLD in the primary link is also initiating the PPDU as a TXOP holder with the same start time.
2. Further, AP2 affiliated with the NSTR mobile AP MLD may initiate a PPDU transmission to its associated non-AP STA (i.e., STA2) in the non-primary link only if the AP affiliated with the same NSTR mobile AP MLD in the primary link (i.e., AP1) is also initiating the PPDU as a TXOP holder with the same start time.

In the embodiments described herein, two entities can be considered—an initiator and a responder. The initiator (e.g., the Mobile AP MLD) intends to change the designation of the primary link and starts the process with the responder (e.g., the non-AP MLD associated with the Mobile AP MLD).

Figure 4:
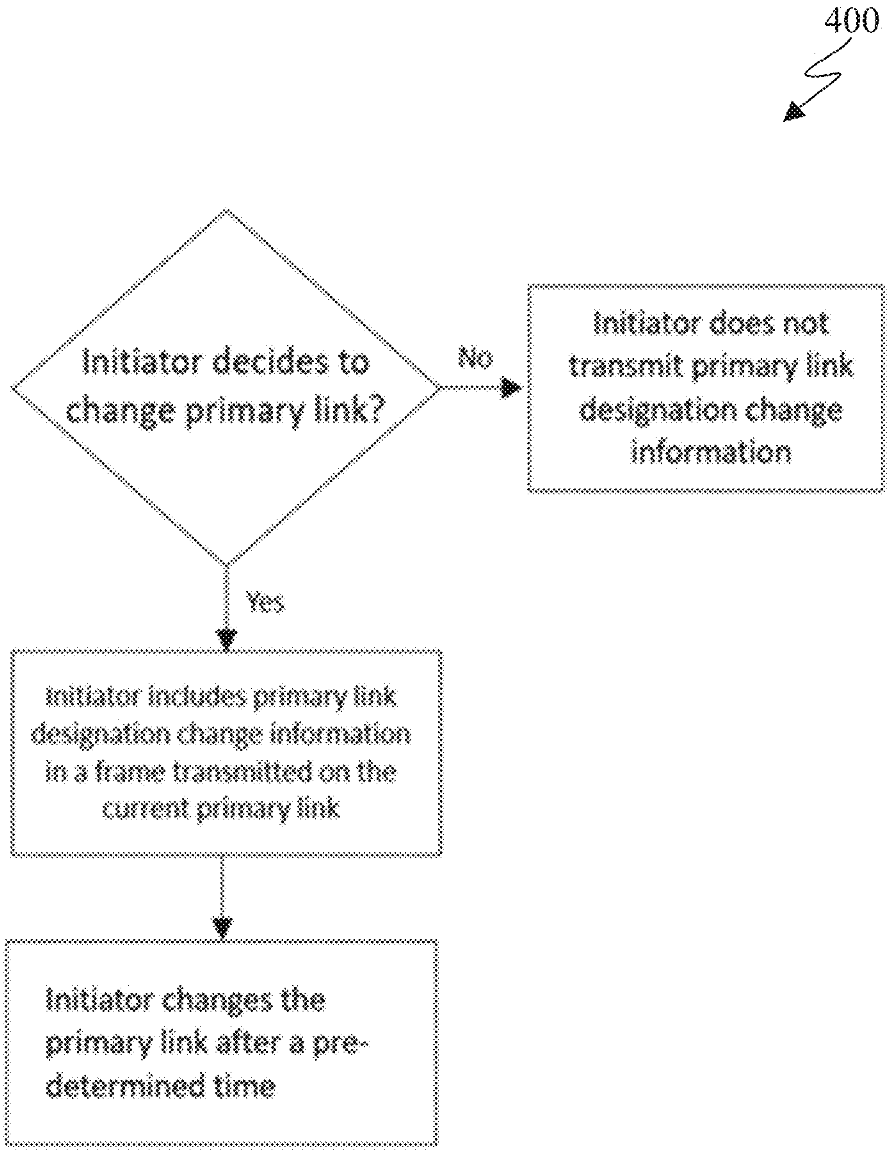
FIG. 4 illustrates an example method for a primary link designation change procedure according to various embodiments of this disclosure.

FIG. 4 illustrates an example method 400 for a primary link designation change procedure according to various embodiments of this disclosure. The embodiment of the example method 400 for a primary link designation change procedure in FIG. 4 is for illustration only. Other embodiments of the example method 400 for a primary link designation change procedure could be used without departing from the scope of this disclosure.

Figure 5:
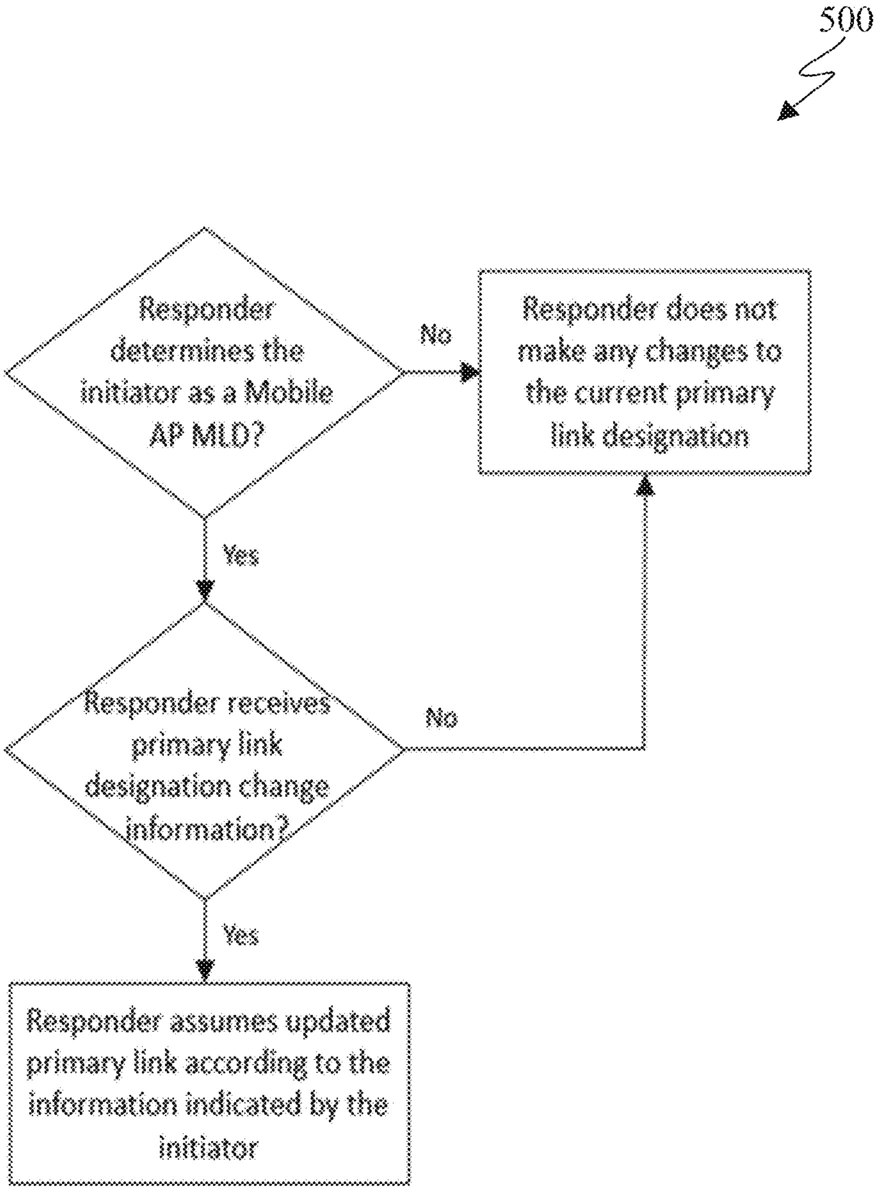
FIG. 5 illustrates another example method for a primary link designation change procedure according to various embodiments of this disclosure.

FIG. 5 illustrates an example method 500 for a primary link designation change procedure according to various embodiments of this disclosure. The embodiment of the example method 500 for a primary link designation change procedure in FIG. 5 is for illustration only. Other embodiments of the example method 500 for a primary link designation change procedure could be used without departing from the scope of this disclosure.

According to one embodiment, when the initiator (e.g., the Mobile AP MLD) decides to change the designation of the primary link, the initiator can transmit the primary link designation change information on the current primary link as shown in FIG. 4. Upon receiving the primary link designation change information from the initiator, the responder can update its primary link information according to the information indicated by the initiator after making necessary verification related to the initiator (e.g., if the initiator is the Mobile AP MLD and the responder is the non-AP MLD, then the responder can check if the initiator is a Mobile AP MLD or alternatively if the initiator is a non-AP MLD and the responder is the Mobile AP MLD, then the responder can check if the initiator is a non-AP MLD associated with it). An example is shown in FIG. 5 when the responder is the non-AP MLD associated with a Mobile AP MLD and the initiator is the Mobile AP MLD.

FIG. 6 illustrates an example MLD capabilities subfield 600 according to various embodiments of this disclosure. The embodiment of the example MLD capabilities subfield 600 in FIG. 6 is for illustration only. Other embodiments of the example MLD capabilities subfield 600 could be used without departing from the scope of this disclosure.

An example format of the MLD Capabilities subfield combining embodiments described herein is as shown in FIG. 6.

According to one embodiment, the primary link designation change information can be included in the MLD capabilities subfield of the Basic Multi-Link element. According to this embodiment, the upon receiving the primary link designation change information in the MLD capabilities subfield of the Basic Multi-Link element, the responder can update the primary link information according to the information indicated in the MLD capabilities subfield.

According to one embodiment, the initiator can convey its intention to change the primary link designation by using one or more of the bits in the MLD capabilities subfield of the Basic Multi-Link element. According to one embodiment, the MLD capabilities subfield of the Basic Multi-Link element can contain a Mobile AP MLD Primary Link Designation Change Indication bit. The initiator that intends to change the designation of the primary link of the Mobile AP MLD, can set the Mobile AP MLD Primary Link Designation Change Indication bit to 1 to indicate the change. When set to 0, the same primary link can be retained.

According to one embodiment, when there are only two links for a Mobile AP MLD (one primary link and one non-primary link) and the initiator sets the Mobile AP MLD Primary Link Designation Change Indication bit to 1, the non-primary link becomes the new primary link and the primary link becomes the new non-primary link.

According to one embodiment, the initiator can indicate the link that it intends to use as the new primary link when making the primary link designation change. Further, according to this embodiment, the initiator can indicate the link ID of the new primary link in the MLD capabilities subfield of the Basic Multi-Link element. As an example, the link ID of the new primary link can be indicated by using the B8~B11 bits.

According to one embodiment, the initiator can indicate the time it intends to change the primary link designation. According to one embodiment, the time it intends to change the primary link designation can be indicated in the MLD capabilities subfield of the Basic Multi-Link element. According to one embodiment, the primary link designation change time can be indicated in terms of a counter whose value would count down in each MLD capabilities subfield that is transmitted by the initiator. As an example, the counter value can be indicated by using the reserved bits (B14~B15) in the MLD capabilities subfield of the Basic Multi-Link element.

According to another embodiment, the time the initiator intends to change the primary link designation can be indicated in the MLD capabilities subfield as a multiple of a fixed pre-negotiated or pre-known value (e.g., TBTT, TU). As an example, the time the initiator intends to change the primary link designation can be indicated by using one or more of the reserved bits (e.g., B14~B15) in the MLD capabilities subfield of the Basic Multi-Link element.

Figure 7:
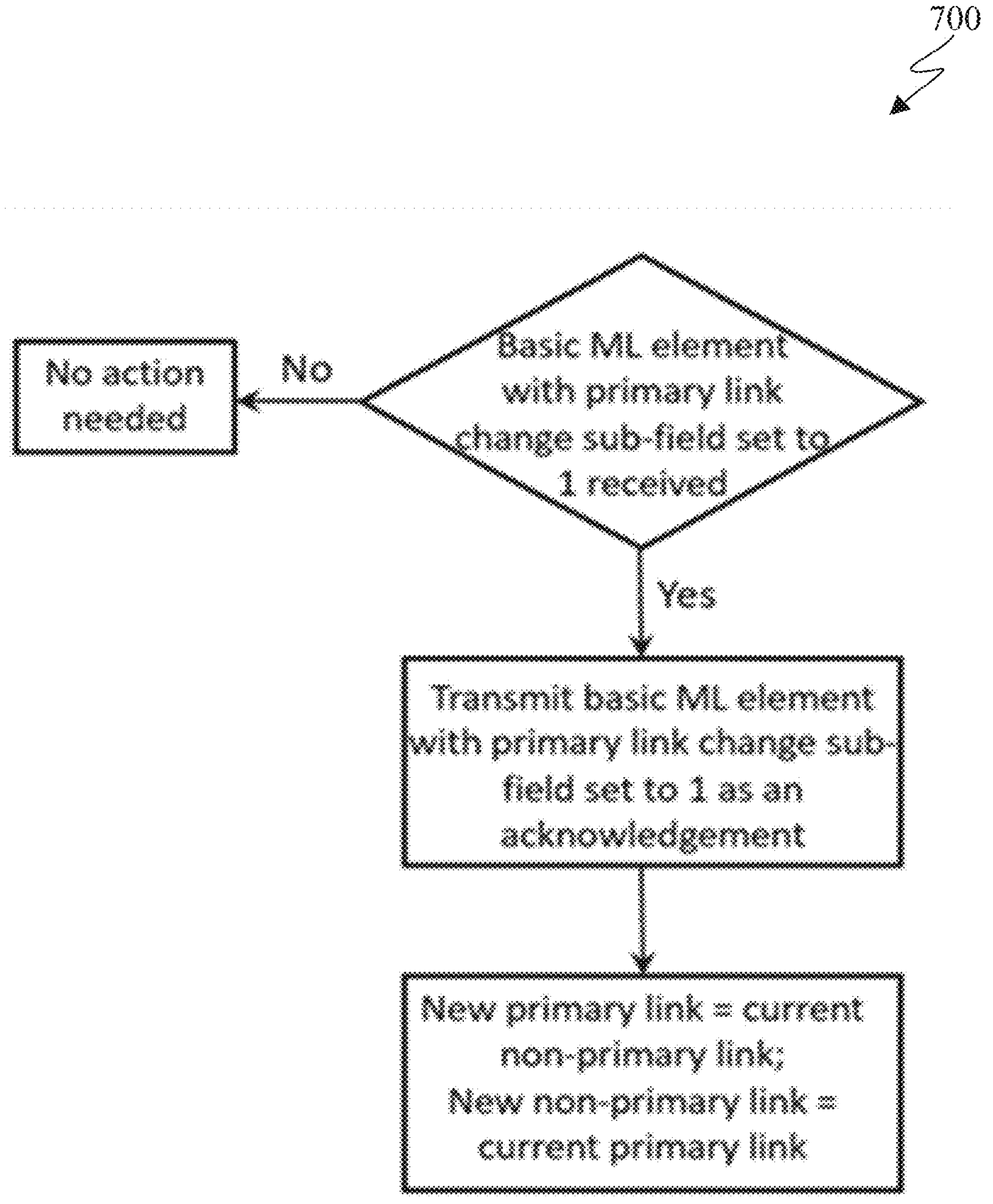
FIG. 7 illustrates an example method for link swapping according to various embodiments of this disclosure.

FIG. 7 illustrates an example method 700 for link swapping according to various embodiments of this disclosure. The embodiment of the example method 700 for link swapping in FIG. 7 is for illustration only. Other embodiments of the example method 700 for link swapping could be used without departing from the scope of this disclosure.

When the responder is the non-AP MLD, then according to one embodiment, the non-AP MLD can switch the primary link operation without any explicit notification to the initiator. In another embodiment, as illustrated in FIG. 7, upon reception of a Basic Multi-Link element with the Primary Link Change subfield set to 1, the associated non-AP MLD may also send another Basic Multi-Link element with the Primary Link Change subfield set to 1 as an acknowledge to the change of primary link designation.

When the initiator is the non-AP MLD, the NSTR Mobile AP MLD may or may not accept the primary link designation change. In such a scenario, the NSTR Mobile AP MLD can explicitly indicate to the non-AP MLD that its request for primary link designation change has been denied by transmitting a basic multi-link element with the primary link change subfield set to 0.

Figure 8:
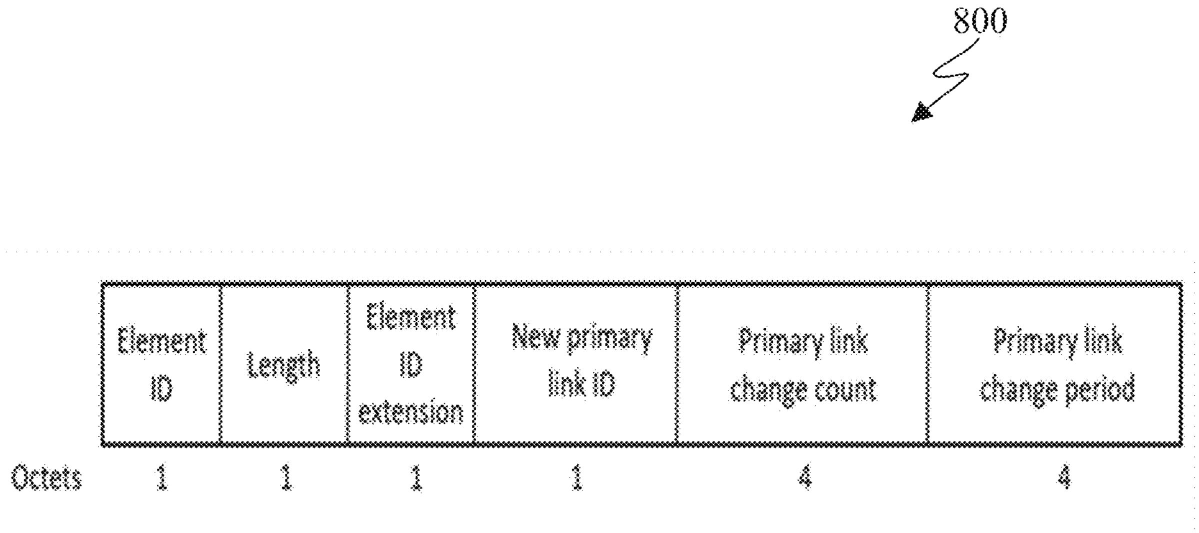
FIG. 8 illustrates an example NSTR mobile AP MLD primary link change element frame format according to various embodiments of this disclosure.

FIG. 8 illustrates an example NSTR mobile AP MLD primary link change element frame format 800 according to various embodiments of this disclosure. The embodiment of the example NSTR mobile AP MLD primary link change element frame format 800 in FIG. 8 is for illustration only. Other embodiments of the example NSTR mobile AP MLD primary link change element frame format 800 could be used without departing from the scope of this disclosure.

According to another embodiment, the NSTR Mobile AP MLD can use a Mobile AP MLD Primary Link Change element to indicate to its associated non-AP MLD about the intention of the NSTR Mobile AP MLD to change the designation of the primary link and the non-primary link via link swapping. The NSTR Mobile AP MLD Primary Link Change element can contain one or more of the following fields:

TABLE I

Details of the fields of the NSTR Mobile AP MLD Primary Link Change element

| Field Name | Details |
|---|---|
| Element ID | The element ID for the NSTR Mobile AP MLD Primary Link Change element |
| Length | The Length of the NSTR Mobile AP MLD Primary Link Change element |
| Element ID extension | The element ID extension for the NSTR Mobile AP MLD Primary Link Change element |
| New Primary Link ID | The Link ID for the link to be designated as the primary link |
| Primary Link Change Count | Time in TBTT from the current TBTT to the time of link swapping |
| Primary Link Change Period | Periodicity of the change if the NSTR Mobile AP MLD intends to periodically switch the designation of the primary link and the non-primary link |

An example embodiment of the NSTR Mobile AP MLD Primary Link Change element is as shown in FIG. 8.

Further, according to this embodiment, for changing the primary link designation, the NSTR mobile AP MLD may also indicate the time in terms of TB TT when the primary link designation will be changed. Moreover, it can also indicate periodicity of the change if the NSTR Mobile AP MLD intends to periodically switch the designation of the primary link and non-primary link.

In order to realize this, the NSTR Mobile AP MLD can send a Mobile AP MLD Primary Link Change element to its associated non-AP MLD in order to indicate the NSTR Mobile AP MLD's intention to change the designation of the primary link and non-primary link.

Figure 9:
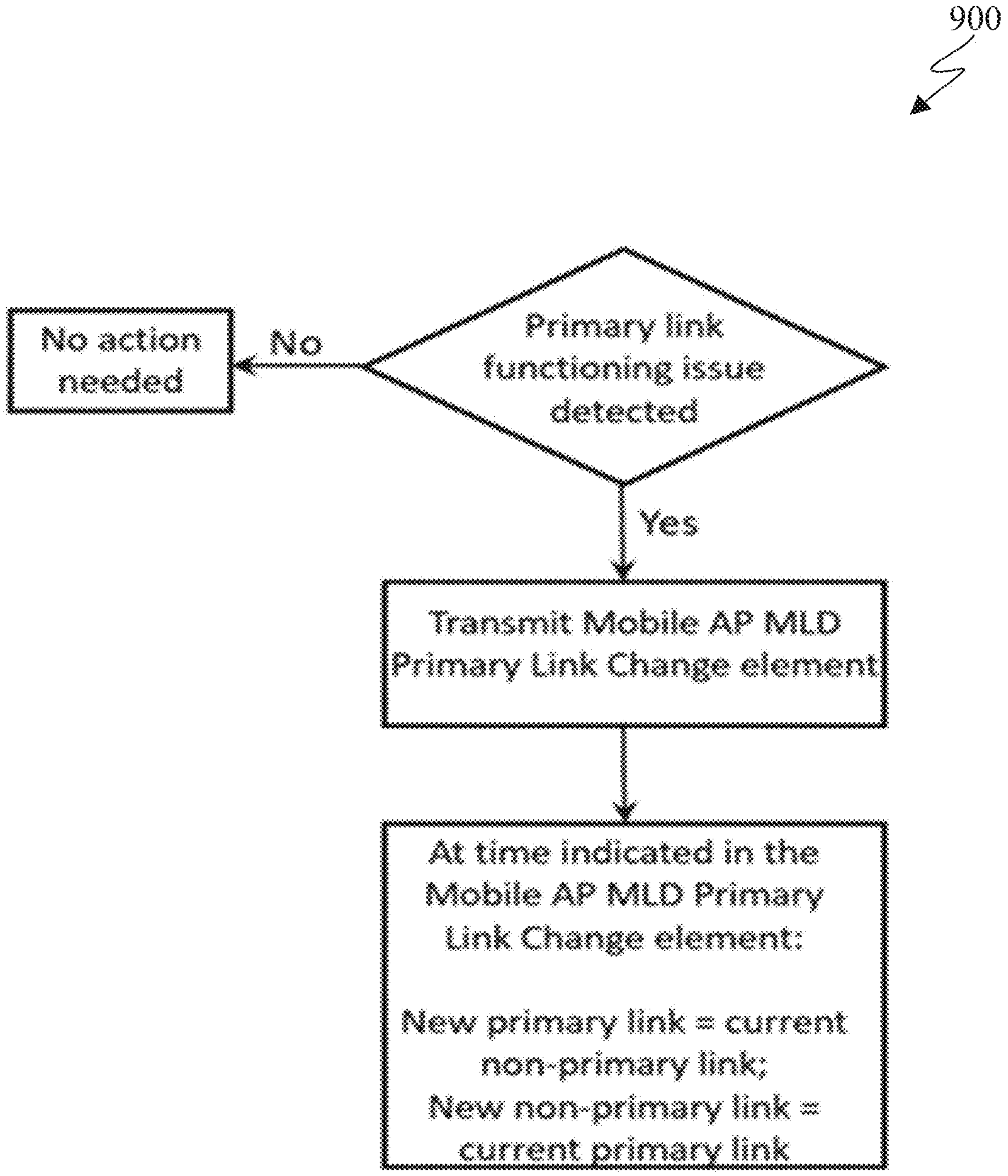
FIG. 9 illustrates an example method for NSTR mobile AP MLD primary link change element operation according to various embodiments of this disclosure.

FIG. 9 illustrates an example method 900 for NSTR mobile AP MLD primary link change element operation according to various embodiments of this disclosure. The embodiment of the example method 900 for NSTR mobile AP MLD primary link change element operation in FIG. 9 is for illustration only. Other embodiments of the example method 900 for NSTR mobile AP MLD primary link change element operation could be used without departing from the scope of this disclosure.

Figure 10:
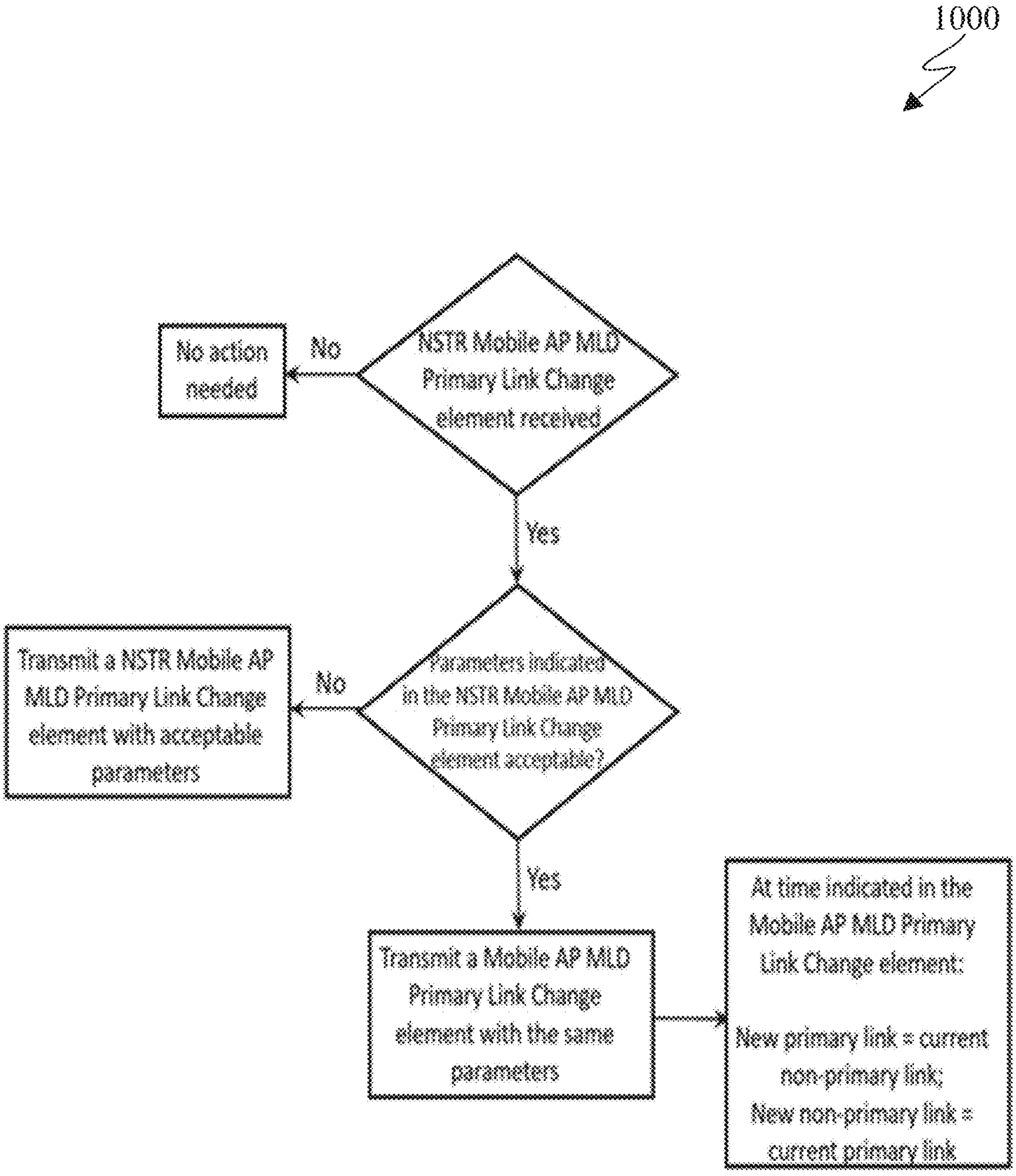
FIG. 10 illustrates another example method for NSTR mobile AP MLD primary link change element operation according to various embodiments of this disclosure.

FIG. 10 illustrates an example method 1000 for NSTR mobile AP MLD primary link change element operation according to various embodiments of this disclosure. The embodiment of the example method 1000 for NSTR mobile AP MLD primary link change element operation in FIG. 10 is for illustration only. Other embodiments of the example method 1000 for NSTR mobile AP MLD primary link change element operation could be used without departing from the scope of this disclosure.

According to another embodiment, one or more of the above subfields can be absent from the Mobile AP MLD Primary Link Change element. According to another embodiment, one or more subfields in addition to the subfields described above can also be present in the Mobile AP MLD Primary Link Change element.

According to another embodiment, the NSTR Mobile AP MLD can send a NSTR Mobile AP MLD Primary Link Change Notification frame to its associated non-AP MLD in order to indicate the NSTR Mobile AP MLD's intention to change the designation of the primary link and non-primary link. The contents of the NSTR Mobile AP MLD Primary Link Change Notification frame would be similar to the subfields described in the previous embodiments—New Primary Link-Link ID, Primary Link Change Count, and Primary Link Change Period.

According to another embodiment, a non-AP MLD can request its associated NSTR Mobile AP MLD to change its Primary link designation. In order to indicate this request, the non-AP MLD can send a Mobile AP MLD Primary Link Change element or NSTR Mobile AP MLD Primary Link Change Notification frame to its associated NSTR Mobile AP MLD.

According to another embodiment, upon reception of a request of NSTR Mobile AP MLD Primary link change from an associated non-AP MLD, the NSTR Mobile AP MLD, as a response to the request, can send another Mobile AP MLD Primary Link Change element or NSTR Mobile AP MLD Primary Link Change Notification frame with the same content as that of request received from the non-AP MLD if the NSTR Mobile AP MLD accepts the request. The procedure for this is as depicted in FIG. 8. In another embodiment, the NSTR Mobile AP MLD either doesn't send any response frame or sends a response frame with content different that received in the request frame from the non-AP MLD.

According to another embodiment, the NSTR indication bitmap subfield of the per-STA profile sub-element in the basic multi-link element can be used for primary link designation indication. Further according to this embodiment, the bit corresponding to the primary link can be set to 1 in this bitmap to indicate the primary link designation.

In one embodiment, this NSTR indication bitmap can be advertised on the non-primary link. Thus, by using the indication, STA(s) of non-AP MLDs operating on the non-primary link can identify the primary link.

In another embodiment, this same bit that is used for primary link designation can be used for primary link designation change. According to this embodiment, when a primary link designation change occurs, the AP can set the bit corresponding to the new primary link in the bitmap to 1. Therefore, STA(s) of non-AP MLDs that receive such a bitmap from the AP can identify the new primary link based which bit is set to 1.

In another embodiment, channel switching can be performed when a need to change the primary link occurs. According to this embodiment, the channel corresponding to the primary link can be changed by performing a channel switching procedure.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A multi-link device (MLD) comprising:
- access points (APs) forming a mobile AP MLD, each AP comprising a transceiver configured to form a link with a corresponding station (STA) associated with a non-AP MLD; and
- a processor operably coupled to the APs, the processor configured to:
  - instruct the APs to form a first link and a second link with the corresponding STAs;
  - designate the first link as a primary link and the second link as a non-primary link;
  - determine that the primary link is experiencing degradation; and
  - in response to determining that the primary link is experiencing degradation and after verification by the associated non-AP MLD at a predetermined time, effect a change in the primary link designation, or
    - implement a channel change procedure to change a channel within the primary link, wherein the predetermined time is indicated in an MLD capabilities subfield of a multi-link element as (i) a counter value or (ii) a multiple of a fixed pre-negotiated value, wherein the MLD capabilities subfield further includes a New Primary Link ID field indicating a link ID of the new primary link,
- wherein the processor is further configured to transmit a primary link change element to the non-AP MLD, the primary link change element including a Primary Link Change Period field indicating a periodicity at which the mobile AP MLD intends to periodically switch a designation of the primary link and the non-primary link.

2. The MLD of claim 1, wherein in order to effect the change in the primary link designation:
- the processor is further configured to indicate, on the non-primary link, availability of the primary link designation, and
- a corresponding transceiver is further configured to transmit a frame including the primary link designation change information, on the primary link, designating the non-primary link as the primary link and the primary link as the non-primary link, wherein the non-AP MLD updates primary link information according to the primary link designation change information after verifying the mobile AP MLD as an initiator of the change.

3. The MLD of claim 1, wherein a corresponding transceiver is configured to transmit a primary link designation indication in a frame including a non-simultaneous transmit receive (NSTR) indication bitmap subfield of a per-STA profile sub element in a multi-link element.

4. The MLD of claim 1, wherein:
- the primary link designation is changed by setting a bit corresponding to the primary link to 1 in a frame including a non-simultaneous transmit receive (NSTR) indication bitmap subfield of a per-STA profile sub element in a multi-link element, and
- the designation of the non-primary link as the primary link takes effect after the predetermined time.

5. The MLD of claim 1, wherein:
- the change of the primary link designation is indicated using 1 bit in the MLD capabilities subfield of the multi-link element,
- the designation of the non-primary link as the primary link takes effect after the predetermined time, and
- the predetermined time is indicated in another MLD capabilities subfield of the multi-link element.

6. The MLD of claim 1, wherein the processor is configured to receive, from the non-AP MLD, an acknowledgement to the change of the primary link designation.

7. The MLD of claim 1, wherein:
- to indicate the change of the primary link designation, a corresponding transceiver is configured to transmit a primary link change element, and
- the designation of the non-primary link as the primary link takes effect after the predetermined time indicated in the primary link change element.

8. A non-access point (AP) multi-link device (MLD) comprising:
- stations (STAs), each comprising a transceiver configured to form a primary link and a non-primary link with a corresponding AP of an MLD comprising APs forming a mobile AP MLD; and
- a processor operably coupled to the STAs, the processor, based on the primary link experiencing degradation, configured to receive, via the transceiver, an indication from the mobile AP MLD about a change in primary link designation at a predetermined time and verify the mobile AP MLD, wherein the predetermined time is indicated in an MLD capabilities subfield of a multi-link element as (i) a counter value or (ii) a multiple of a fixed pre-negotiated value, wherein the MLD capabilities subfield further includes a New Primary Link ID field indicating a link ID of the new primary link,
- wherein the processor is further configured to receive, from the mobile AP MLD, a primary link change element including a Primary Link Change Period field indicating a periodicity at which the mobile AP MLD intends to periodically switch a designation of the primary link and the non-primary link.

9. The non-AP MLD of claim 8, wherein in order to effect the change in the primary link designation:
- the processor is further configured to receive an indication, on the non-primary link, of availability of primary link designation, and
- a corresponding transceiver is configured to receive a frame including the primary link designation change information, on the primary link, designating the non-primary link as the primary link and the primary link as the non-primary link, wherein the non-AP MLD updates primary link information according to the primary link designation change information after verifying the mobile AP MLD as the initiator of the change.

10. The non-AP MLD of claim 8, wherein a corresponding transceiver is configured to receive a primary link designation indication in a frame including a non-simultaneous transmit receive (NSTR) indication bitmap subfield of a per-STA profile sub element in a multi-link element.

11. The non-AP MLD of claim 8, wherein:

the transceiver is further configured to receive a frame including a non-simultaneous transmit receive (NSTR) indication bitmap subfield of a per-STA profile sub element in a multi-link element, a bit in the bitmap, corresponding to the primary link is set to 1 indicating the change in the primary link designation, and the designation of the non-primary link as the primary link takes effect after the predetermined time.

12. The non-AP MLD of claim 8, wherein:

the change of the primary link designation is indicated using 1 bit in the MLD capabilities subfield of the multi-link element, the designation of the non-primary link as the primary link takes effect after the predetermined time, and the predetermined time is indicated in another MLD capabilities subfield of the multi-link element.

13. The non-AP MLD of claim 8, wherein the transceiver is configured to transmit, to the mobile AP MLD, an acknowledgement to the change of the primary link designation.

14. A method for wireless communication performed by an access point (AP) multi-link device (MLD), the AP MLD comprising APs forming a mobile AP MLD, the method comprising:

forming links with corresponding stations (STAs) associated with a non-AP MLD;

instructing the APs to form a first link and a second link with the corresponding STAs;

designating the first link as a primary link and the second link as a non-primary link;

determining that the primary link is experiencing degradation;

in response to determining that the primary link is experiencing degradation and after verification by the associated non-AP MLD at a predetermined time, effecting a change in the primary link designation, or implementing a channel change procedure to change a channel within the primary link, wherein the predetermined time is indicated in an MLD capabilities subfield of a multi-link element as (i) a counter value or (ii) a multiple of a fixed pre-negotiated value, wherein the MLD capabilities subfield further includes a New Primary Link ID field indicating a link ID of the new primary link; and transmitting a primary link change element to the non-AP MLD, the primary link change element including a Primary Link Change Period field indicating a periodicity at which the mobile AP MLD intends to periodically switch a designation of the primary link and the non-primary link.

15. The method of claim 14, wherein effecting the change in the primary link designation further comprises:

indicating, on the non-primary link, availability of the primary link designation; and transmitting a frame including the primary link designation change information, on the primary link, designating the non-primary link as the primary link and the primary link as the non-primary link, wherein the non-AP MLD updates primary link information according to the primary link designation change information after verifying the mobile AP MLD as the initiator of the change.

16. The method of claim 14, further comprising transmitting a primary link designation indication in a frame including a non-simultaneous transmit receive (NSTR) indication bitmap subfield of a per-STA profile sub element in a multi-link element.

17. The method of claim 14, further comprising changing the primary link designation by setting a bit corresponding to the primary link to 1 in a frame including a non-simultaneous transmit receive (NSTR) indication bitmap subfield of a per-STA profile sub element in a multi-link element, wherein the designation of the non-primary link as the primary link takes effect after the predetermined time.

18. The method of claim 14, further comprising:

indicating the change of the primary link designation using 1 bit in the MLD capabilities subfield of the multi-link element;

designating the non-primary link as the primary link after the predetermined time; and indicating the predetermined time in another MLD capabilities subfield of the multi-link element.

19. The method of claim 14, further comprising receiving, from the non-AP MLD, an acknowledgement to the change of the primary link designation.

20. The method of claim 14, further comprising:

indicating the change of the primary link designation via transmission of a primary link change element; and designating the non-primary link as the primary link after the predetermined time indicated in the primary link change element.

* * * * *